United States Patent [19]

Peterson et al.

[11] Patent Number: 5,031,954
[45] Date of Patent: Jul. 16, 1991

[54] MOUNTING BRACKET AND ARM ASSEMBLY FOR A VEHICLE SUNSHADE AND METHOD OF INSTALLING SAME IN A VEHICLE

[75] Inventors: Don M. Peterson, Quincy; Edward L. Danner, Warren, both of Mich.

[73] Assignee: Van Dresser Corporation, Troy, Mich.

[21] Appl. No.: 605,039

[22] Filed: Oct. 29, 1990

[51] Int. Cl.[5] .............................................. B60J 3/00
[52] U.S. Cl. .................................. 296/97.9; 296/97.13
[58] Field of Search ............................ 296/97.9, 97.13

[56] References Cited

U.S. PATENT DOCUMENTS

| 2,357,974 | 9/1944 | Roberts | 243/289 |
| 2,939,741 | 6/1960 | Keating et al. | 296/97.13 |
| 3,017,217 | 11/1962 | Keating | 296/97 |
| 4,178,035 | 12/1979 | Cziptschirsch | 296/97 K |
| 4,377,020 | 3/1983 | Vigo | 16/329 |
| 4,529,157 | 7/1985 | Suman et al. | 248/289.1 |
| 4,729,590 | 3/1988 | Adams | 296/97.13 |
| 4,902,068 | 2/1990 | Dowd et al. | 296/97.13 X |
| 4,989,911 | 2/1991 | Van Order | 296/97.9 |

FOREIGN PATENT DOCUMENTS 1251479 10/1971 United Kingdom ............. 296/97.13

Primary Examiner—Margaret A. Focarino
Assistant Examiner—Gary C. Hoge
Attorney, Agent, or Firm—Jeffers, Hoffman & Niewyk

[57] ABSTRACT

A mounting bracket assembly for a sunshade including an inner bracket having an integrally formed square boss that is inserted into a corresponding hole in the sheet metal roof of a vehicle. A bracket arm is snapped into the inner bracket, and includes a key that fits within an arcuate keyway in the inner bracket. Upon initial pivoting of the bracket arm, the key engages the end wall of the keyway and causes the inner bracket to rotate to a locked position wherein the square boss is against the back surface of the roof and the key freely moves within the arcuate keyway through the range of sunshade operation. An outer bracket snaps over the inner bracket prior to its insertion into the roof, in order to keep the assembly against the headliner when the inner bracket is rotated. A tool having an arcuate tip may be inserted into an opening in the inner bracket for removal of the sunshade. A method of installing a sunshade incorporating the mount is also disclosed, including attachment of the mount to a modular headliner prior to installation in the roof.

20 Claims, 6 Drawing Sheets

MOUNTING BRACKET AND ARM ASSEMBLY FOR A VEHICLE SUNSHADE AND METHOD OF INSTALLING SAME IN A VEHICLE

BACKGROUND OF THE INVENTION

The present invention relates generally to sunshades for vehicles and, more particularly, to a mounting bracket and arm assembly that allows the sunshade to be installed in a vehicle without the use of tools or fasteners.

Sunshades for vehicles are typically mounted on the vehicle body roof by an elbow bracket that provides both a horizontal axis about which a visor blade pivots between a storage position adjacent the vehicle headliner and a use position adjacent the windshield, and a vertical axis about which the visor pivots approximately 90° between a forward windshield position and a side window position. One method of mounting the elbow bracket in the headliner of the vehicle to the underlying sheet metal roof is by a plurality of screws; however, sunshade mounts not requiring the use of screws have also been proposed, including snap-in and bayonet type designs.

Several problems are associated with the use of screws to attach a sunshade mounting bracket to a vehicle roof, including the amount of labor required for assembly, unsightliness of the screws, variations in the sunshade mounting angle caused by improperly torqued screws, and the possibility of producing scrap components due to improper assembly techniques. In general, prior art snap-in mount designs have addressed these problems; however, such mounts do not appear to provide as secure an attachment and may be more difficult to attach and/or detach from the vehicle roof.

A bayonet type mounting arrangement for a vehicle sunshade generally includes a locking member that is inserted into an aperture in the vehicle roof and is then rotated so that lugs or tabs on the locking member engage the back side of the roof. In such an arrangement, it is necessary to provide a way to rotate the locking member to its engaged position so that it will remain there during normal operation of the sunshade. In one prior art design, a separate tool is required to rotate the locking member to its engaged position.

Other bayonet type sunshade mounts permit rotation of the locking member by frictional interaction with the bracket arm, i.e. the elbow bracket, whereby rotation of the bracket arm causes the locking member to rotate to its engaged position. In order that the sunshade may then be rotated between the forward windshield position and the side window position without disengaging the locking member, the locking member is held in its engaged position by screws or by retention of the lugs or tabs of the locking member within corresponding slots or recesses. In the latter case, the mount requires several spring components and the application of an axial force during installation and removal.

A vehicle headliner typically covers the interior of the vehicle sheet metal roof prior to installation of the sunshade mount. In one type of vehicle interior design, a modular headliner is provided having various vehicle trim items already attached thereto prior to installation of the modular headliner into a vehicle. This has the advantage of reducing assembly steps and costs; however, none of the prior art sunshade mounts are particularly adapted for incorporation into such a modular headliner system.

SUMMARY OF THE INVENTION

The present invention overcomes the problems and disadvantages of the aforementioned prior art sunshade mounts by providing a bayonet-type mount, and method for using same, wherein a locking member is inserted into an aperture in the vehicle roof and is then positively rotated to an engaged position adjacent the back surface of the roof by rotation of the bracket arm. Once the locking member is in its engaged position, the bracket arm may be freely rotate through an operating angle of the sunshade.

In general, the invention provides a sunshade mount including a bracket arm that is rotatably connected to a bracket assembly in a manner permitting rotation of the bracket arm between a front windshield position and a side window position. The bracket assembly includes a locking member that is inserted into an aperture in the vehicle roof and is then rotated to engage the back surface of the roof to attach the bracket assembly thereto. An engagement mechanism allows the bracket ar both to effect rotation of the locking member to its engaged position and, thereafter, to rotate relative the locking member. Accordingly, rotation of the bracket arm is used for both installation and operation of the sunshade.

More specifically, the invention provides, in one form thereof, a sunshade mount having an engagement mechanism cooperating between the bracket arm and locking member. Where a generally cylindrical rod portion of the bracket arm is received within a generally cylindrical central bore of the locking member, a preferred engagement mechanism includes a key on the rod portion that is received within an arcuate keyway formed in the wall of the bore. In this manner, the bracket arm may rotate relative the locking member through an arc angle of rotation beyond which the key engages the end wall of the keyway and causes the locking member to rotate with the bracket arm.

In one form of the invention, a tool may be inserted into the keyway, thereby decreasing the angle through which the bracket arm can rotate relative the locking member and facilitating removal of the sunshade. In another form of the invention, the bracket assembly is attachable to a modular headliner prior to attachment of the sunshade and headliner assembly to the vehicle roof.

An advantage of the sunshade mount of the present invention is that a positive engagement between the bracket arm and the locking member is provided, thereby allowing the sunshade to be securely, reliably, and uniformly attached to the vehicle roof by simple rotation of the bracket arm without the use of tools or fasteners, and without the application of axial force.

Another advantage of the sunshade mount of the present invention is that, once installed, the sunshade may be rotated through its operating angle between the front windshield and side window without affecting the integrity of the mounting arrangement.

A further advantage of the sunshade mount of the present invention is that the mounting bracket and arm assembly may be attached to a modular headliner prior to installation in a vehicle, thereby facilitating manufacture of a complete headliner subassembly and providing means for attaching the subassembly to the vehicle.

Yet another advantage of the sunshade mount of the present invention is that the sunshade may be easily removed from the vehicle roof by inserting a tool into the bracket assembly and rotating the bracket arm.

A still further advantage of the sunshade mount of the present invention is that the engagement mechanism may also serve as a rotation stop to limit rotation of the sunshade.

The invention, in one form thereof, provides a sunshade mount for attaching a sunshade to a vehicle roof having an aperture therein. The mount includes a bracket assembly having a locking member that is insertable into the aperture in the vehicle roof. The bracket assembly engages the vehicle roof upon rotation of the locking member. A bracket arm is rotatably connected to said bracket assembly. An engagement mechanism cooperates between the bracket arm and the locking member to establish an arc angle of rotation through which the bracket arm can freely rotate relative the locking member, and beyond which rotation of the bracket arm causes the locking member to rotate. In this manner, the bracket assembly engages the vehicle roof upon rotation of the bracket arm, and thereafter permits the bracket arm to operably rotate relative the locking member.

The invention further provides, in one form thereof, a method of attaching a sunshade to a vehicle roof in a manner permitting rotation of the sunshade through a operating angle between a front windshield position and a side window position. An aperture is provided in the vehicle roof, and a sunshade mount is provided, including a bracket assembly having a locking member that is insertable into the aperture. The locking member engages the vehicle roof upon rotation of the locking member. The provided sunshade mount also includes a bracket arm that is rotatably connected to the bracket assembly, and an engagement mechanism that cooperates between the bracket arm and the locking member. The bracket arm is capable of rotating through an arc angle of rotation relative the locking member beyond which rotation of the bracket arm causes the locking member to rotate. The method of the present invention further includes the step of placing the sunshade mount adjacent the vehicle roof such that the locking member is inserted into the aperture. The bracket arm is then rotated until the locking member is caused to rotate and engage the vehicle roof, and such that the arc angle of rotation of the bracket arm relative the locking member is at least coincident with the operating angle of the sunshade.

DESCRIPTION OF THE PREFERRED EMBODIMENT

Figure 1:
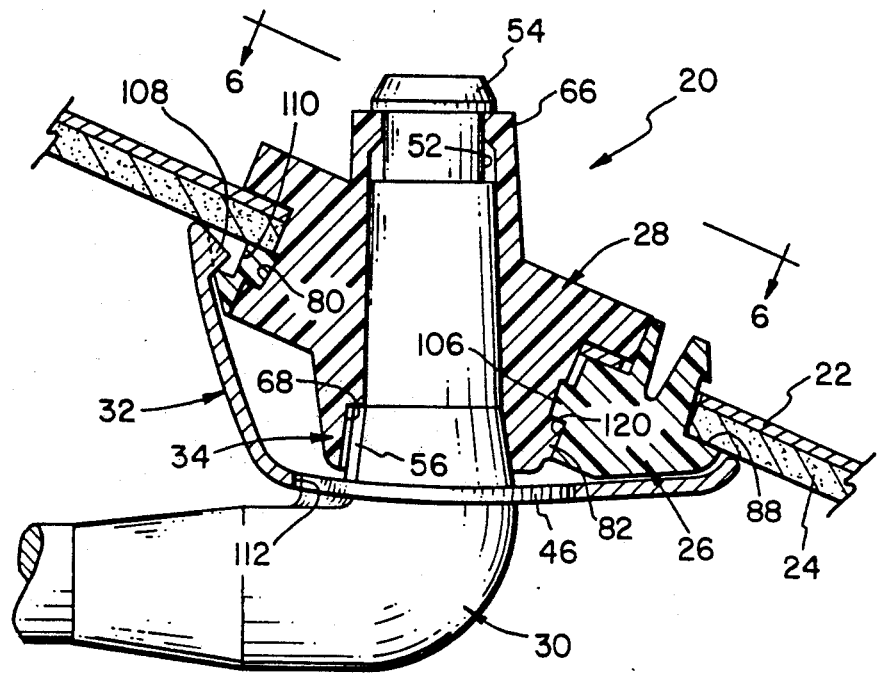
FIG. 1 is a fragmentary partial sectional view of the mounting bracket and arm assembly of the present invention shown installed in a vehicle roof.

Referring now to the drawings, and in particular to FIG. 1, a mounting bracket and arm assembly 20 for an automotive sunshade is shown operably attached to a vehicle roof having a sheet metal layer 22 and a covering 24 of foam-backed cloth or some other suitable headliner material. Assembly 20 generally includes a stationary outer bracket 26, a rotatable inner bracket 28, a bracket arm 30 rotatably connected to inner bracket 28, and a bracket shield 32 snap-fittingly attached to outer bracket 26. In accordance with the present invention, an engagement mechanism 34 allows bracket arm 30 to freely rotate relative inner bracket 28 through an arc angle of rotation beyond which rotation of bracket arm 30 causes inner bracket 28 to rotate and engage the vehicle roof, as will be more fully described hereinafter.

Figure 2:
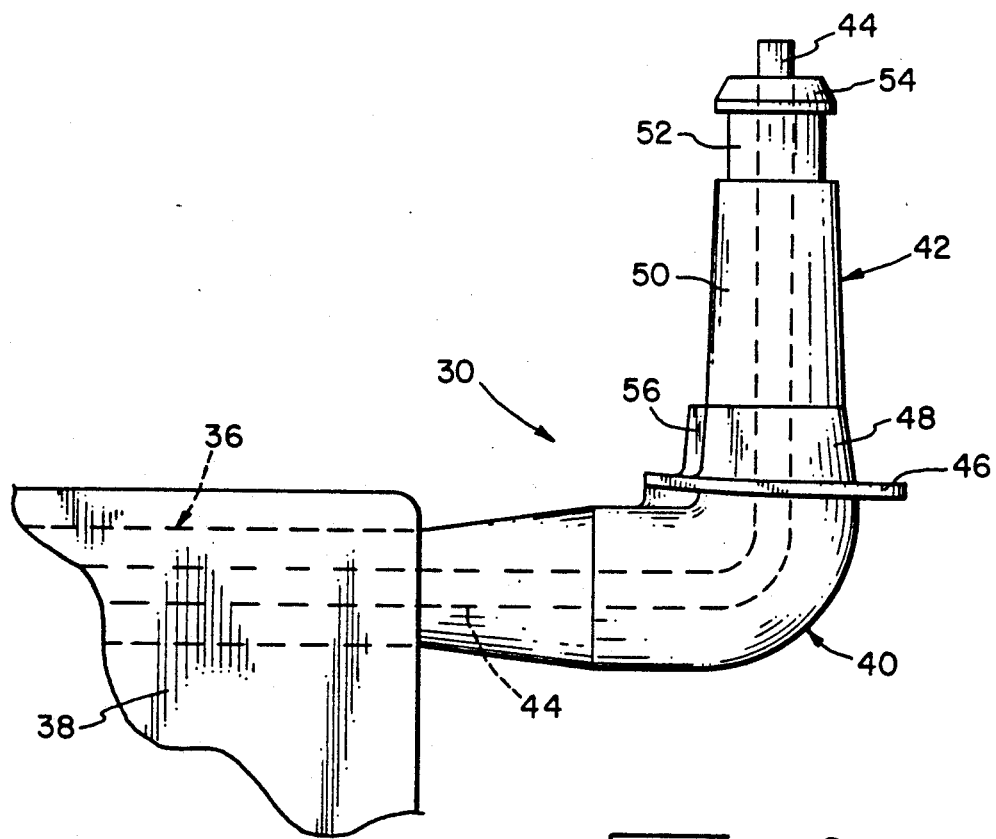
FIG. 2 is a fragmentary elevational view of the bracket arm of the assembly of FIG. 1.

Referring to FIG. 2, bracket arm 30 is L-shaped, including a generally cylindrical horizontal leg portion 36 on which a visor blade 38 is rotatably mounted, an elbow portion 40, and a generally cylindrical vertical leg portion 42. In the preferred embodiment, bracket arm 30 is molded from a glass-filled nylon material, and includes an electrically conductive wire core 44, comprising a SAE 1010 steel rod. Wire core 44 provides reinforcement for bracket arm 30, and is capable of carrying electrical current to any electrical accessories on the sunshade.

Figure 3:
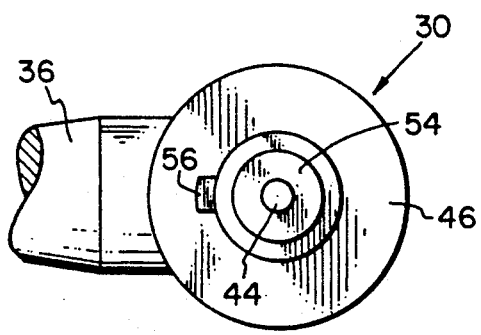
FIG. 3 is a top view of the bracket arm of FIG. 2, particularly showing the engagement key.

Vertical leg portion 42 of bracket arm 30 includes a radially extending lower flange 46, a lower tapered section 48, an intermediate tapered section 50, an upper recessed section 52, and a head 54. Lower tapered section 48 includes an axially extending engagement key 56, which is integrally molded with and extends radially outwardly from vertical leg portion 42, as shown in FIGS. 2 and 3. In the disclosed preferred embodiment, engagement key 56 constitutes a first component of engagement mechanism 34, enabling bracket arm 30 to engage inner bracket 28.

Figure 4:
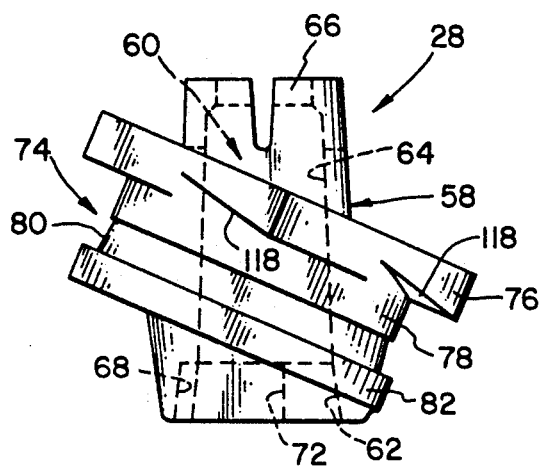
FIG. 4 is an elevational view of the inner bracket of the assembly of FIG. 1.
Figure 5:
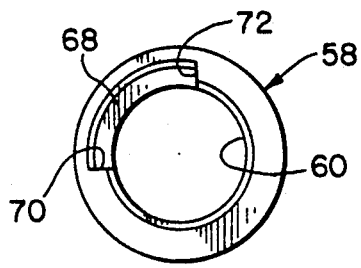
FIG. 5 is a bottom view of the inner bracket of the assembly of FIG. 1, particularly showing the arcuate keyway in which the engagement key of the bracket arm is disposed.
Figure 6:
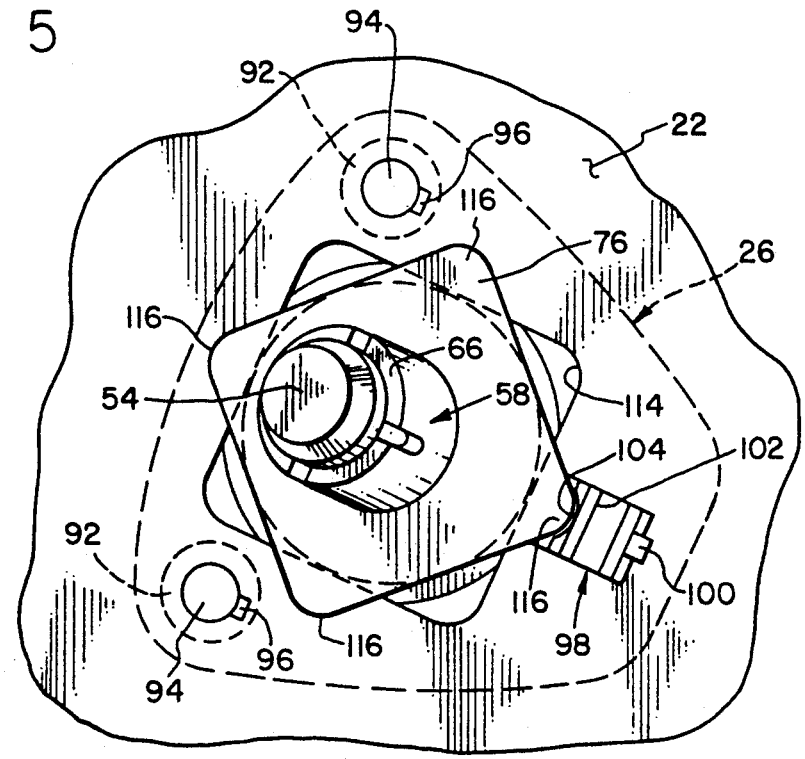
FIG. 6 is a view of the mounting bracket and arm assembly of FIG. 1 as seen from behind the vehicle roof, viewed in the direction of line 6—6 in FIG. 1.

Referring now to FIGS. 4–6, inner bracket 28 is molded from a suitable plastic, e.g., an acetal copolymer, and includes a body portion 58 defining a vertically disposed, generally cylindrical bore 60 in which leg portion 42 of bracket arm 30 is received. Bore 60 includes a lower tapered section 62 and an intermediate tapered section 64, which correspond to tapered sections 48 and 50 of bracket arm 30, respectively. Bracket arm 30 is axially retained within bore 60 by four circularly arranged, resilient locking tangs 66 formed in the upper end of body portion 58. Specifically, when bracket arm 30 is axially introduced into bore 60, tangs 66 are caused to radially expand and then retract into recessed section 52, whereat tangs 66 contact the underside of head 54. A desired amount of rotational friction between bracket arm 30 and inner bracket 28 is achieved by forming intermediate tapered sections 50 and 64 with slightly different taper angles, thereby causing an interference fit therebetween.

Lower tapered section 62 of inner bracket 28 includes a radially outwardly recessed arcuate keyway 68, adapted to receive engagement key 56 when bracket arm 30 is connected to inner bracket 28, as previously described. In one embodiment of the present invention, the arc angle of keyway 68 is approximately 90°, as defined by keyway endwalls 70 and 72 shown in FIG. 5. In the disclosed preferred embodiment, keyway 68 constitutes a second component of engagement mechanism 34, enabling inner bracket 28 to be engaged by bracket ar 30.

Inner bracket 28 further includes an integrally molded central flange portion 74, which lies generally in a plane that is at an oblique angle relative the axis of bore 60, as best shown in FIG. 4. Flange portion 74 comprises several distinct layered sections, including an uppermost square locking boss 76, a cylindrical spacer portion 78, an annular snap recess 80, and a lowermost annular thrust ring 82.

Figure 12:
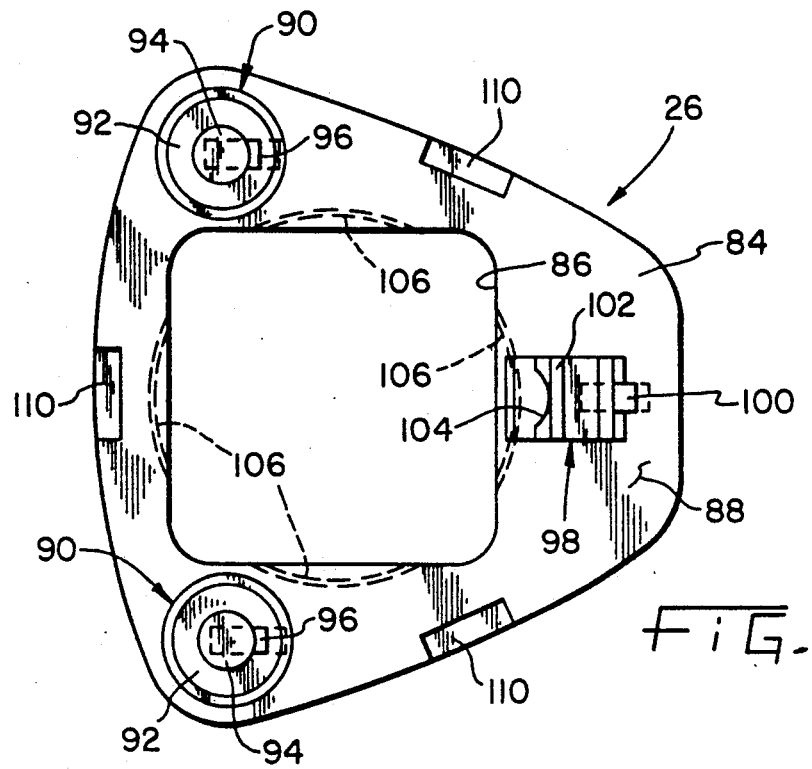
FIG. 12 is a plan view of the outer bracket of the assembly of FIG. 1, showing the surface adjacent the vehicle roof.

Referring now to FIGS. 1 and 12, outer bracket 26 comprises a molded plastic body 84, including a square opening 86 corresponding in shape to square locking boss 76 of inner bracket 28. A roof-contacting surface 88 of body 84 includes a pair of elevated mounting bosses 90, each including a base portion 92, a top portion 94, and a resilient locking finger 96 extending radially outwardly from top portion 94. Similarly, a third rectangular mounting boss 98 extend upwardly from surface 88 and includes a resilient locking finger 100 and a resilient detent tang 102 having a rounded recess 104.

Prior to installation of mounting bracket and arm assembly 20 into a vehicle roof, the previously described component parts, i.e., outer bracket 26, inner bracket 28, bracket arm 30, and bracket shield 32, are assembled in the following manner. First, inner bracket 28 is rotatably connected to outer bracket 26 by aligning square locking boss 76 with square opening 86 and passing it through the opening until locking recess 80 of inner bracket 28 receives four arc-shaped locking members 106 by snap engagement. Referring to FIGS. 1 and 12, locking members 106 ar circularly arranged concentrically with square opening 86, and are axially spaced from and extend radially outwardly of the sides of the square opening. The resulting inner-outer bracket subassembly is characterized by the inner bracket being rotatably retained by the outer bracket.

The next step of assembling mounting bracket and arm assembly 20 involves attaching bracket shield 32 to outer bracket 26 by engagement of three tabs 108 on shield 32 with three corresponding indentations 110 formed on the periphery and roof-contacting surface 88 of outer bracket 26, as shown in FIGS. 1 and 12. In the preferred embodiment, shield 32 is molded from plastic, e.g., an acetal copolymer, that is flexible enough to deform slightly in order to snap tabs 108 into indentations 110. Shield 32 also includes an aperture 112, through which bracket arm 30 extends.

Bracket arm 30 is attached to the bracket subassembly by introducing vertical leg 42, through aperture 112 of shield 32, into bore 64 of inner bracket 28. Locking engagement of bracket arm 30 with inner bracket 28 occurs as previously described, wherein engagement key 56 is received within arcuate keyway 68, thereby permitting bracket arm 30 to rotate relative inner bracket 28 through an arc angle determined by keyway 56. Note in FIG. 1 that lower flange 46 of bracket arm 30 fills aperture 112 of shield 32 with only slight clearance in order to aesthetically cover and conceal the inner and outer brackets. Aperture 112 and elbow portion 40 are designed such that the bracket shield can be detached and rotated 90° away from the bracket subassembly for servicing and removal of assembly 20.

Referring to FIGS. 1, 6, and 7A–7C, mounting bracket and arm assembly 20 is mounted into a vehicle roof in the following manner. Sheet metal layer 22 and covering 24 of the roof must be provided with an aperture 114 corresponding generally in shape to locking boss 76 of inner bracket 28. While the disclosed embodiment shows a square aperture and boss, other shapes may be used to achieve the desired locking action. Also, suitable apertures must be provided circumjacent aperture 114 for receiving mounting bosses 90 and 98. The orientation of aperture 114 and locking boss 76 will be dictated by the following preferred manner of installation.

Figure 7A:
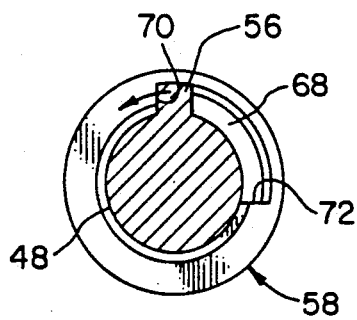
FIGS. 7A-7C are a series of sectional views of the assembly of FIG. 1, taken along the line 7—7 in FIG. 1 and viewed in the direction of the arrows, showing engagement of the bracket arm with the inner bracket, pivoting of the bracket arm and the inner bracket, and pivoting of the bracket arm while the inner bracket remains stationary, respectively.

In the preferred manner of installation, roof-contacting surface 88 of outer bracket 26 is brought adjacent the vehicle roof with inner bracket 28 rotated such that locking boss 76 is aligned with aperture 114 in the roof. In this position, the locking boss is inserted through the aperture and mounting bosses 90 and 98 of the outer bracket are received within corresponding apertures in the roof to prevent rotation of the outer bracket relative the roof. Locking fingers 96 and 100 engage the back surface of the roof and temporarily prevent axial removal of assembly 20. In the aforementioned aligned orientation of inner bracket 28, bracket arm 30 is brought to a midway position between the front windshield position and the side window position, i.e., at an approximate 45° angle, whereat engagement key 56 contacts endwall 70 of keyway 68, as shown in FIG. 7A.

Figure 7B:
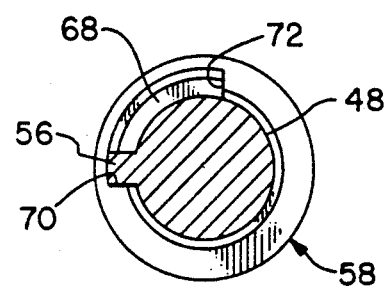

Subsequent movement of bracket arm 30 towards the front windshield position will cause inner bracket 28 to rotate relative outer bracket 26 to the position represented by FIG. 7B. In this position, corners 116 of square locking boss 76 engage the back surface of sheet metal layer 22, as shown in FIG. 6. As illustrated in FIG. 4, corners 116 include ramped portions 118 on their roof-engaging side, which function to lift the locking boss axially away from sheet metal layer 22 as the locking boss is rotated. Consequently, the tendency for inner bracket 28 lift axially is transferred to outer bracket 26 by thrust ring 82 acting within a counterbore 120 formed in the outer bracket, as shown in FIG. 1. This provides a clamping force on the vehicle roof between locking boss 76 and roof-contacting surface 88 of outer bracket 26.

Figure 7C:
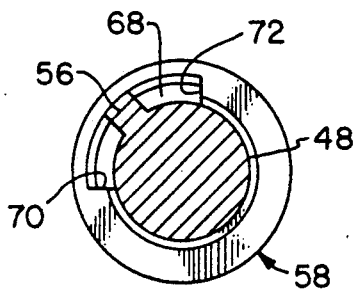

Rotation of locking boss 76 to its engaged position of FIG. 6 results in one of its corners 116 resiliently actuating detent tang 102 and then being engaged within recess 104. Detent tang 102 provides an indication to the installer that the locking boss has been rotated to its engaged position, and also functions to prevent any tendency for inner bracket 28 to rotate in response to rotation of bracket arm 30 relative the inner bracket through its operating range. FIG. 7C shows engagement key 56 at a midpoint of arcuate keyway 68, representing a midway operating position of the bracket arm once assembly 20 has been installed. In the disclosed embodiment, endwalls 70 and 72 limit the range of operation of bracket arm 30 to 90°; however, keyway 68 could extend beyond an angle of 90°.

Figure 8:
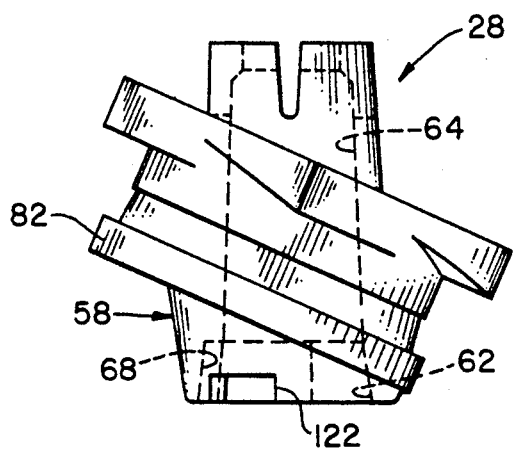
FIG. 8 is an elevational view of an alternative inner bracket for use in the assembly of FIG. 1 in accordance with an alternative embodiment of the present invention, wherein the inner bracket has an opening therein to accept a tool for removing the assembly from the vehicle roof.
Figure 10:
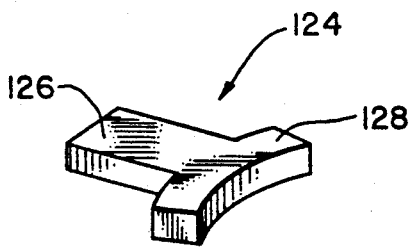
FIG. 10 is a perspective view of a tool used in conjunction with the alternative inner bracket of FIG. 8.
Figure 9:
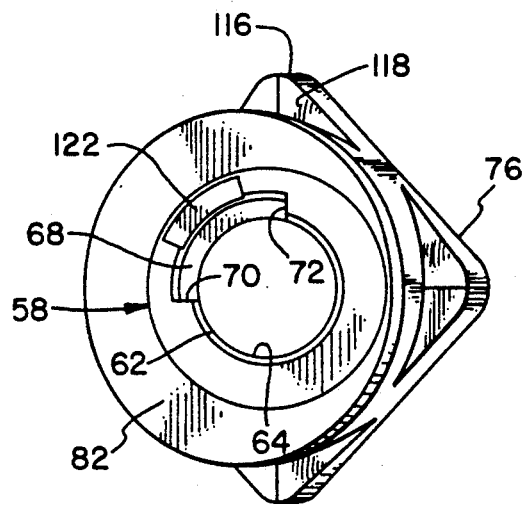
FIG. 9 is a bottom view of the alternative inner bracket of FIG. 8.

In an alternative embodiment of the present invention, wherein mounting bracket and arm assembly 20 is capable of being easily removed from a vehicle after installation, inner bracket 28 is provided with an access opening 122 extending through the cylindrical sidewall of body 58, as shown in FIGS. 8 and 9. Opening 122 provides access to arcuate keyway 68 for introducing a tool 124 having a handle portion 126 and an arcuate head portion 128, as shown in FIG. 10. Opening 122 has an axial height and arc length less than that of keyway 68, so that it does not interfere with the movement of engagement key 56 within keyway 68, or reduce the strength of body 58. Likewise, head portion 128 of tool 124 is appropriately shaped to pass through opening 122 and fit within keyway 68.

Figure 11A:
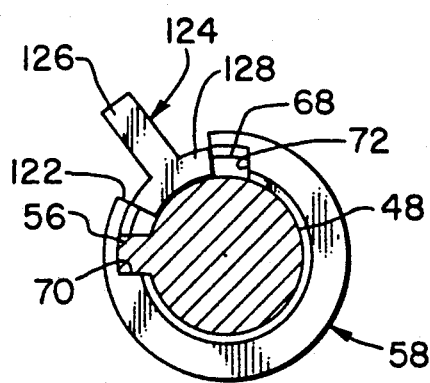
FIGS. 11A-11C are a series of sectional views similar to those of FIGS. 7A-7C, showing the tool of FIG. 1 being inserted into the opening of the alternative inner bracket of FIG. 8, then engaging the key and keyway end wall as the bracket ar is rotated, and then rotating with the bracket arm and inner bracket to remove the assembly from the vehicle roof.
Figure 11B:
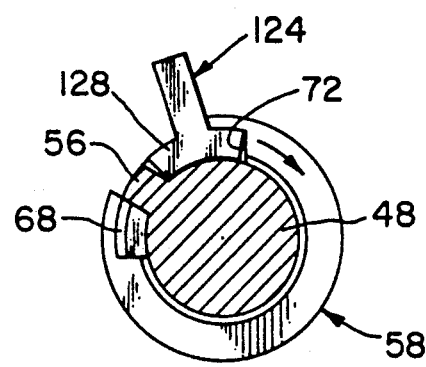
Figure 11C:
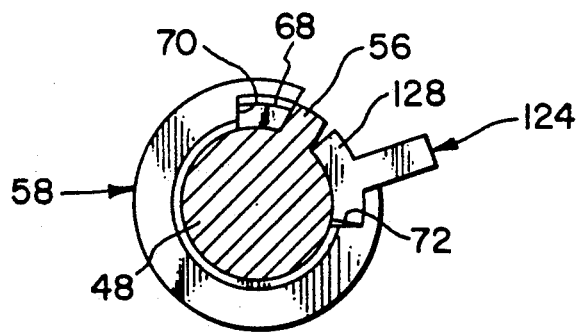

When inner bracket 28 of FIG. 8 is incorporated into an assembly 20 of the present invention, the assembly may be removed from the vehicle after installation by detaching shield 32, as previously discussed, and then using tool 124 in the following manner. With the bracket arm in the front windshield position, as represented in FIG. 11A, engagement key 56 is adjacent endwall 70, thereby providing room for head portion 128 of tool 124 to be inserted into keyway 68 through opening 122. Introducing head portion 128 into keyway 68 effectively decreases the arc angle through which bracket arm 30 may rotate relative inner bracket 28. As illustrated in FIG. 11B, only slight rotation of bracket arm 30 away from the front windshield position causes key 56 to engage head portion 128 and move it so as to be engaged intermediate key 56 and endwall 72. Now, further rotation of bracket arm 30 causes rotation of inner bracket 28 to a position shown in FIG. 11C, corresponding to FIG. 7A, whereat locking boss 76 is disengaged from sheet metal layer 22 and is aligned with aperture 114 for axial removal from the roof.

While a particular access opening and tool for the purpose of removing assembly have been disclosed, other means for altering the arc angle of rotation of the bracket arm relative the inner bracket are contemplated.

Figure 13:
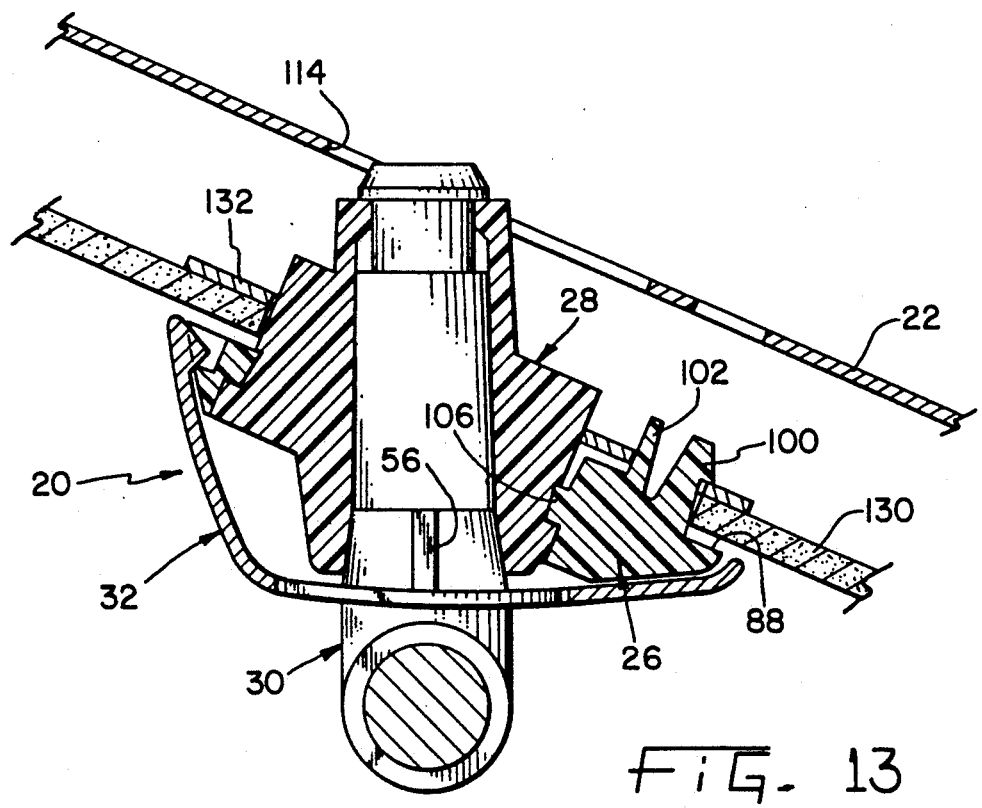
FIG. 13 is an exploded fragmentary partial sectional view of the mounting bracket and arm assembly of FIG. 1 as modified to include a backing plate that allows the assembly to be mounted to a modular headliner while the bracket arm is in position to be inserted into an aperture in the vehicle roof.
Figure 14:
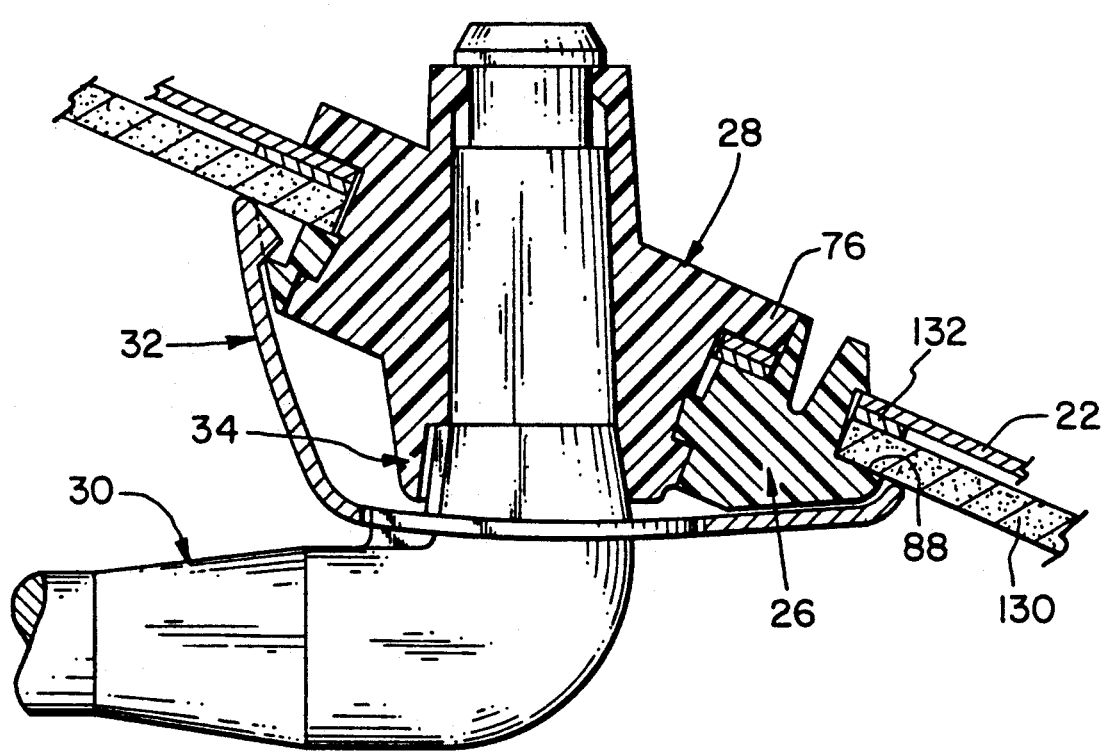
FIG. 14 is a fragmentary partial sectional view of the mounting bracket and arm assembly of FIG. 13 after the assembly has been engaged with the vehicle roof so as to clamp the modular headliner intermediate the outer bracket and the roof.

FIGS. 13 and 14 relate to an alternative embodiment of the present invention, wherein a modular headliner 130 is preassembled with trim accessories (not shown) prior to installation in a vehicle. One such commercially available modular headliner is a Tramvax headliner manufactured by Van Dresser Corporation of Troy, Mich. According to the alternative embodiment of FIGS. 13 and 14, outer bracket 26 is attached to headliner 130, independently of locking boss 76, prior to installation of assembly 20 in sheet metal layer 22 of the vehicle roof. Specifically, previously described mounting bosses 90 and 98 extend through corresponding apertures in headliner 130 and, with locking fingers 96 and 100, engage a backing plate 132. Although outer bracket 26 could be attached to headliner 130 without backing plate 132, a molded plastic or metal backing plate ensures a secure foundation for locking fingers 96 and 100, independent of the material used for the headliner.

Referring again to FIG. 13, headliner 130 is loosely retained intermediate surface 88 of outer bracket 26 and backing plate 132, and outer bracket 26 is prevented from rotational movement relative headliner 130 by mounting bosses 90 and 98. Bracket arm 30 is free to rotate to the position shown in FIG. 13, wherein locking boss 76 is aligned with opening 114 in sheet metal layer 22. Sheet metal layer 22 also has the necessary apertures for bosses 90 and 98, as previously described.

In order to both mount the sunshade to the vehicle and secure headliner 130 to the sheet metal roof, assembly 20, with both headliner 130 and backing plate 132 attached thereto, is first raised into mounting position adjacent the roof. Locking boss 76 of inner bracket 28 is then caused to engage the back surface of sheet metal layer 22 by the previously described movement of bracket arm 30 in connection with the operation of engagement mechanism 34 of the present invention. As seen in FIG. 14, an axial clamping force is exerted on headliner 130, backing plate 132, and sheet metal layer 22, all of which are intermediate surface 88 of outer bracket 26 and locking boss 76.

While the disclosed backing plate is shown as being flat, it may have any contour necessary to mate with the underlying sheet metal roof. Also, while sheet metal layer 22 is disclosed as being at a particular oblique angle relative vertical leg portion 42 of bracket arm 30, thereby necessitating a similar oblique angle between flange portion 74 and bore 64 of inner bracket 28, it will be appreciated that these angle may be altered without departing from the present invention.

It will be appreciated that the foregoing description of various embodiments of the invention is presented by way of illustration only and not by way of any limitation, and that various alternatives and modifications may be made to the illustrated embodiments without departing from the spirit and scope of the invention.

What is claimed is:

1. Mounting apparatus for attaching a sunshade to a vehicle roof having an aperture therein, comprising:
    bracket means, including a locking member insertable into the aperture in the vehicle roof, for engaging the vehicle roof upon rotation of said locking member;
    a bracket arm rotatably connected to said bracket means; and
    engagement means cooperating between said bracket arm and said locking member for establishing an arc angle of rotation through which said bracket arm rotates relative said locking member and beyond which rotation of said bracket arm causes said locking member to rotate, thereby allowing said bracket means to engage said vehicle roof upon rotation of said bracket arm and thereafter permitting said bracket arm to operably rotate relative said locking member.

2. The apparatus of claim 1, in which:
said engagement means comprises an engagement key associated with one of said bracket means and said bracket arm, and a keyway associated with the other of said bracket means and said bracket arm, said engagement key being received within said keyway.

3. The apparatus of claim 2, in which:
said bracket means includes a generally cylindrical bore having an inner wall and said bracket arm includes a generally cylindrical rod portion having an outer wall, said rod portion being rotatably retained within said bore, said engagement key being associated with said bracket arm and extending radially outwardly from said outer wall, and said keyway being associated with said bracket means and being formed in said inner wall to define an arcuate keyway.

4. The apparatus of claim 3, in which:
said bracket means includes means for introducing a tool into said arcuate keyway in order to reduce said arc angle of rotation of said bracket arm relative said locking member.

5. The apparatus of claim 1, wherein the sunshade is attachable to the vehicle roof in a manner permitting rotation of the sunshade through an operating angle between a front windshield position and a side window position, in which:
said arc angle of rotation of said bracket arm relative said locking member is at least coincident with the operating angle of the sunshade.

6. The apparatus of claim 5, in which:
said arc angle of rotation of said bracket arm relative said locking member defines the limits of the operating angle of the sunshade.

7. The apparatus of claim 1, in which:
said bracket means includes a stationary outer bracket adapted to contact the front surface of the vehicle roof and a rotatable inner bracket adapted to contact the back surface of the vehicle roof.

8. The apparatus of claim 7, in which:
said outer bracket includes detent locking means adapted for resiliently engaging said locking member upon rotation of said locking member to its engaged position with the vehicle roof.

9. The apparatus of claim 1, and further comprising:
a modular headliner, said bracket means being attached to said headliner independently of said locking member, whereby the sunshade including said headliner engage the vehicle roof upon insertion of said locking member into the aperture in the vehicle roof and subsequent rotation of said locking member.

10. The apparatus of claim 9, and further comprising:
a backing plate positioned on the back side of said headliner intermediate said headliner and said vehicle roof when the sunshade is attached to the vehicle roof, said bracket means including means extending through said headliner for engaging said backing plate and maintaining attachment of said bracket means to said headliner prior to attachment of the sunshade to the vehicle roof.

11. The apparatus of claim 1, in which:
said bracket arm rotates relative said bracket means about an axis that is inclined with respect to the axis of rotation of said locking member.

12. The apparatus of claim 1, in which:
said bracket means includes means for receiving a tool in order to reduce said arc angle of rotation of said bracket arm relative said locking member.

13. Mounting apparatus for attaching a sunshade to a vehicle roof having an aperture therein, comprising:
an outer bracket adapted to contact the front surface of the vehicle roof and to overlie the aperture therein;
an inner bracket rotatably connected to said outer bracket and including a locking portion adapted to extend through the aperture in the vehicle roof when said inner bracket operably contacts the front surface of the vehicle roof, said locking portion being adapted to engage the back surface of the vehicle roof upon rotation of said inner bracket;
a bracket arm rotatably connected to said inner bracket; and
engagement means cooperating between said bracket arm and said inner bracket for establishing an arc angle of rotation through which said bracket arm rotates relative said inner bracket and beyond which rotation of said bracket arm causes said inner bracket to rotate, thereby allowing said locking portion to engage the vehicle roof upon rotation of said bracket arm and thereafter permitting said bracket arm to operably rotate relative said inner bracket.

14. The apparatus of claim 13, wherein said outer bracket includes anti-rotational means adapted for engaging the vehicle roof and preventing rotation of said outer bracket relative the vehicle roof, and further comprising:
a modular headliner, said outer bracket being attached to said headliner by said anti-rotational means independently of said locking member, whereby the sunshade including said headliner engage the vehicle roof upon insertion of said locking member into the aperture in the vehicle roof and subsequent rotation of said locking member.

15. The apparatus of claim 13, in which:
said inner bracket includes a generally cylindrical bore having an inner wall and said bracket arm includes a generally cylindrical rod portion having an outer wall, said rod portion being rotatably retained within said bore; and
said engagement means comprises an engagement key associated with said bracket arm and extending radially outwardly from said outer wall, and a keyway associated with said inner bracket and being formed in said inner wall to define an arcuate keyway in which said engagement key is received.

16. The apparatus of claim 15, in which:
said inner bracket includes means for introducing a tool into said arcuate keyway in order to interfere with the free movement of said engagement key within said arcuate keyway, thereby effectively reducing said arc angle of rotation of said bracket arm relative said locking member in order that the sunshade may be detached from the vehicle roof.

17. The apparatus of claim 13, and further comprising:
an outer bracket shield snap-fittingly attached to said outer bracket and including an opening through which said bracket arm extends.

18. A method of attaching a sunshade to a vehicle roof in a manner permitting rotation of the sunshade through an operating angle between a front windshield position and a side window position, comprising the steps of:

provide an aperture in the vehicle roof;

providing a sunshade mount including a bracket assembly having a locking member that is insertable into the aperture in the vehicle roof and that engages the vehicle roof upon rotation of the locking member, a bracket arm that is rotatably connected to the bracket assembly, and an engagement mechanism cooperating between the bracket arm and the locking member such that the bracket arm is capable of rotating through an arc angle of rotation relative the locking member beyond which rotation of the bracket arm causes the locking member to rotate;

placing the sunshade mount adjacent the vehicle roof such that the locking member is inserted into the aperture; and rotating the bracket arm until the locking member is caused to rotate and engage the vehicle roof, and such that the arc angle of rotation of the bracket arm relative the locking member is at least coincident with the operating angle of the sunshade.

19. The method of claim 18, wherein the bracket assembly of the provided sunshade mount includes a stationary outer bracket and a rotating inner bracket on which the locking member is formed, and further comprising the step of:

attaching the outer bracket to a modular headliner independently of the locking member prior to performing the step of placing the sunshade mount adjacent the vehicle, said step of placing the sunshade mount adjacent the vehicle roof being performed with the modular headliner substantially intermediate the outer bracket and the vehicle roof.

20. The method of claim 18, and further comprising the steps of:

altering the arc angle of rotation of the bracket arm relative the locking member by introducing a tool into the engagement mechanism of the provided sunshade mount, such that the arc angle of rotation of the bracket arm relative the locking member is less than the operating angle of the sunshade;

rotating the bracket arm through at least a portion of the operating angle of the sunshade until the locking member is caused to rotate and be aligned with the aperture in the vehicle roof whereat the locking member is disengaged from the vehicle roof; and removing the sunshade mount from the vehicle roof, whereby the sunshade is attachable to the vehicle roof without the use of tools and is then detachable by the use of a tool.

* * * * *

UNITED STATES PATENT AND TRADEMARK OFFICE
CERTIFICATE OF CORRECTION

PATENT NO. : 5,031,954
DATED : July 16, 1991
INVENTOR(S) : Don M. Peterson et al It is certified that error appears in the above-indentified patent and that said Letters Patent is hereby corrected as shown below:

On the Title Page, item "[73] Assignee:"

insert --Crotty Corporation, Quincy, Mich.,-- before "Van Dresser Corporation".

Signed and Sealed this

Second Day of August, 1994

Attest:

BRUCE LEHMAN

*Attesting Officer*        Commissioner of Patents and Trademarks